(12) United States Patent
Ferg et al.

(10) Patent No.: US 8,407,802 B2
(45) Date of Patent: Mar. 26, 2013

(54) METHOD AND SYSTEM FOR PROVIDING SECURITY SEALS ON WEB PAGES

(75) Inventors: Barry Ferg, North Vancouver (CA); Gary Krall, Saratoga, CA (US); David M'Raihi, San Carlos, CA (US); Nicolas Popp, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 459 days.

(21) Appl. No.: 12/750,007

(22) Filed: Mar. 30, 2010

(65) Prior Publication Data

US 2011/0126292 A1    May 26, 2011

Related U.S. Application Data

(60) Provisional application No. 61/264,179, filed on Nov. 24, 2009.

(51) Int. Cl.
*G06F 7/04*    (2006.01)

(52) U.S. Cl. ........................................................ 726/26
(58) Field of Classification Search .................... 726/26
See application file for complete search history.

(56) References Cited

U.S. PATENT DOCUMENTS

2006/0015722 A1*  1/2006  Rowan et al. ................. 713/166
2011/0283174 A1* 11/2011  M'Raihi et al. ............... 715/205

* cited by examiner

*Primary Examiner* — Cordelia Zecher
(74) *Attorney, Agent, or Firm* — Lowenstein Sandler LLP

(57) ABSTRACT

A method of providing web site verification information to a user includes receiving a DNS query including a host name and a seal verification site name, parsing the DNS query, and extracting the host name from the DNS query. The method also includes accessing a DNS zone file including a list of Trust Services customers and determining if the host name is associated with a Trust Services customer in the list of Trust Services customers. The method further includes transmitting a positive identifier to the requester if the host name is associated with a Trust Services customer and transmitting a negative identifier to the requester if the host name is not associated with a Trust Services customer. In a specific embodiment, the Trust Services include issuance of digital certificates.

32 Claims, 7 Drawing Sheets

METHOD AND SYSTEM FOR PROVIDING SECURITY SEALS ON WEB PAGES

CROSS-REFERENCES TO RELATED APPLICATIONS

This application claims benefit under 35 U.S.C. §119(e) of U.S. Provisional Patent Application No. 61/264,179, filed on Nov. 24, 2009, entitled "Method and System for Providing Security Seals on Web Pages," the disclosure of which is hereby incorporated by reference in its entirety for all purposes.

BACKGROUND OF THE INVENTION

Security seals are used as a sign of trust on the Internet. As an example, the VeriSign Secured® Seal is a leading sign of trust on the Internet. Widely recognized, the VeriSign Secured® Seal appears on web pages secured by VeriSign SSL Certificates as a dynamic, animated graphic or in a static version. SSL certificates are also referred to as digital certificates or certificates. After a browser loads a web page, the user is able to click on the seal to verify the web site's information in real time.

Despite the benefits provided by existing security seals, there is a need in the art for improved methods and systems for providing security seals.

SUMMARY OF THE INVENTION

The present invention relates generally to computer networks. More specifically, the present invention relates to methods and systems for providing security seals on web pages. Merely by way of example, the invention has been applied to a method and system for verifying web sites and providing verification information to Internet users. In a particular embodiment, web sites found in a search are displayed along with a graphic representing an existing verification provided by a security seal vendor. As an example, a security seal could be displayed adjacent or next to a web site link resulting from a search, indicating that the web site, for instance, is malware free, has been scanned for vulnerabilities, and/or has an SSL certificate. We will call the different services available to any given customer (e.g., malware scanning, vulnerability scanning, SSL certificate, and the like) Trust Services in the following sections of this document. The methods and techniques can be applied to a variety of computer networks and communications systems.

According to an embodiment of the present invention, a method of providing web site verification information to a user is provided. The method includes receiving a DNS query including a host name and a seal verification site name, parsing the DNS query, and extracting the host name from the DNS query. The method also includes accessing a DNS zone file including a list of Trust Services customers and determining if the host name is associated with a Trust Services customer in the list of Trust Services customers. The method further includes transmitting a positive identifier to the requester if the host name is associated with a Trust Services customer and transmitting a negative identifier to the requester if the host name is not associated with a Trust Services customer. As an example, a certificate customer is a Trust Services customer in a particular embodiment.

According to another embodiment of the present invention, a method of displaying a security seal in a web browser is provided. The method includes transmitting a search request to a search engine and receiving a search result from the search engine. The search result includes at least one host name. The method also includes transmitting a DNS query to a seal verification server. The DNS query includes the at least one host name. The method further includes receiving seal information associated with the at least one host name from the seal verification site, displaying the search result including the at least one host name, and displaying the security seal in association with the at least one host name.

According to a specific embodiment of the present invention, a system for providing web site verification information to a user is provided. The system includes a data processor, a communications module coupled to the data processor, and a computer readable medium coupled to the data processor and storing a plurality of instructions for controlling the data processor to provide the web site verification information to the user. The plurality of instructions include instructions that cause the data processor to receive a DNS query including a host name and a seal verification site name, instructions that cause the data processor to parse the DNS query, and instructions that cause the data processor to extract the host name from the DNS query. The plurality of instructions also include instructions that cause the data processor to access a DNS zone file including a list of Trust Services customers and instructions that cause the data processor to determine if the host name is associated with a Trust Services customer in the list of Trust Services customers. The plurality of instructions further include instructions that cause the data processor to transmit a positive identifier to the requester if the host name is associated with a Trust Services customer and instructions that cause the data processor to transmit a negative identifier to the requester if the host name is not associated with a Trust Services customer. As an example, a certificate customer is a Trust Services customer in a particular embodiment.

According to another specific embodiment of the present invention, a system for displaying a security seal in a web browser is provided. The system includes a data processor, a communications module coupled to the data processor, and a computer readable medium coupled to the data processor and storing a plurality of instructions for controlling the data processor to display the security seal in the web browser. The plurality of instructions include instructions that cause the data processor to transmit a search request to a search engine and instructions that cause the data processor to receive a search result from the search engine. The search result includes at least one host name. The plurality of instructions also include instructions that cause the data processor to transmit a DNS query to a seal verification server. The DNS query includes the at least one host name. The plurality of instructions further include instructions that cause the data processor to receive seal information associated with the at least one host name from the seal verification site, instructions that cause the data processor to display the search result including the at least one host name, and instructions that cause the data processor to display the security seal in association with the at least one host name.

According to an alternative embodiment of the present invention, a method for displaying security information in search results is provided. The method includes transmitting a request to a search engine and receiving a response from the search engine. The response includes a host name. The method also includes transmitting a request to a Trust Services provider. As an example, the Trust Services provider could be a certificate authority providing digital certificates. The request includes the host name. The method further includes receiving a response from the Trust Services provider, determining that the host name is associated with a customer of the Trust Services provider, displaying the host name in search results, and displaying a security seal adjacent to the host name in the search results. The request can be transmitted in accordance with several protocols, including DNS, DNSSEC, HTTP and HTTPS. The response can include not only a positive or negative indication related to the customer status of the host name, but additional information including the class or type of Trust Services, for example, the class or type of a certificate. For different classes and types of Trust Services, different security seals can be displayed. Trust services purchased by the customers can include digital certificates, malware detection, security vulnerability analysis, and the like.

According to another alternative embodiment of the present invention, a system for displaying security information in search results is provided. The system includes a data processor, a communications module coupled to the data processor, and a computer readable medium coupled to the data processor and storing a plurality of instructions for controlling the data processor to display the security information in the search results. The plurality of instructions include instructions that cause the data processor to transmit a request to a search engine and instructions that cause the data processor to receive a response from the search engine. The response includes a host name. The plurality of instructions also include instructions that cause the data processor to transmit a request to a Trust Services provider. As an example, the Trust Services provider could be a certificate authority providing digital certificates. The request includes the host name. The plurality of instructions further include instructions that cause the data processor to receive a response from the Trust Services provider, instructions that cause the data processor to determine that the host name is associated with a customer of the Trust Services provider, instructions that cause the data processor to display the host name in the search results, and instructions that cause the data processor to display a security seal adjacent to the host name in the search results. The request can be transmitted in accordance with several protocols, including DNS, DNSSEC, HTTP and HTTPS. The response can include not only a positive or negative indication related to the customer status of the host name, but additional information including the class or type of Trust Services, for example, the class or type of a certificate. For different classes and types of Trust Services, different security seals can be displayed. Trust services purchased by the customers can include digital certificates, malware detection, security vulnerability analysis, and the like.

Numerous benefits are achieved by way of the present invention over conventional techniques. For example, embodiments of the present invention provide Internet users with an increased level of trust in web sites returned in a search. Utilizing a DNS query to access information on Trust Services (e.g., SSL certificate issuance), embodiments of the present invention provide a rapid response using widely available DNS resolution systems that are both efficient and scalable. Using high reliability DNS servers and subdomains, web site status (e.g., if a web site has been scanned and is malware free, has an SSL certificate, or the like) is verified using existing resources, reducing maintenance costs. As described more fully throughout the present specification, when a user running a search sees security seals displayed next to selected web site links in the search results, the user knows that these web sites are secure and will be more likely to click on the links to these secure web sites, increasing the traffic to these sites and demonstrating the value of a site investing in security to protect present and future users. Embodiments of the present invention offer a high level of granularity to transform a set of data into a visual representation easy to understand for consumers. The seal image displayed next to a search result is the compilation of a rich data set, including security scanning, type of security used by a web site, possibly privacy information, or the like, into a single visual representation. These and other embodiments of the invention along with many of its advantages and features are described in more detail in conjunction with the text below and attached figures.

DETAILED DESCRIPTION OF SPECIFIC EMBODIMENTS

Figure 1:
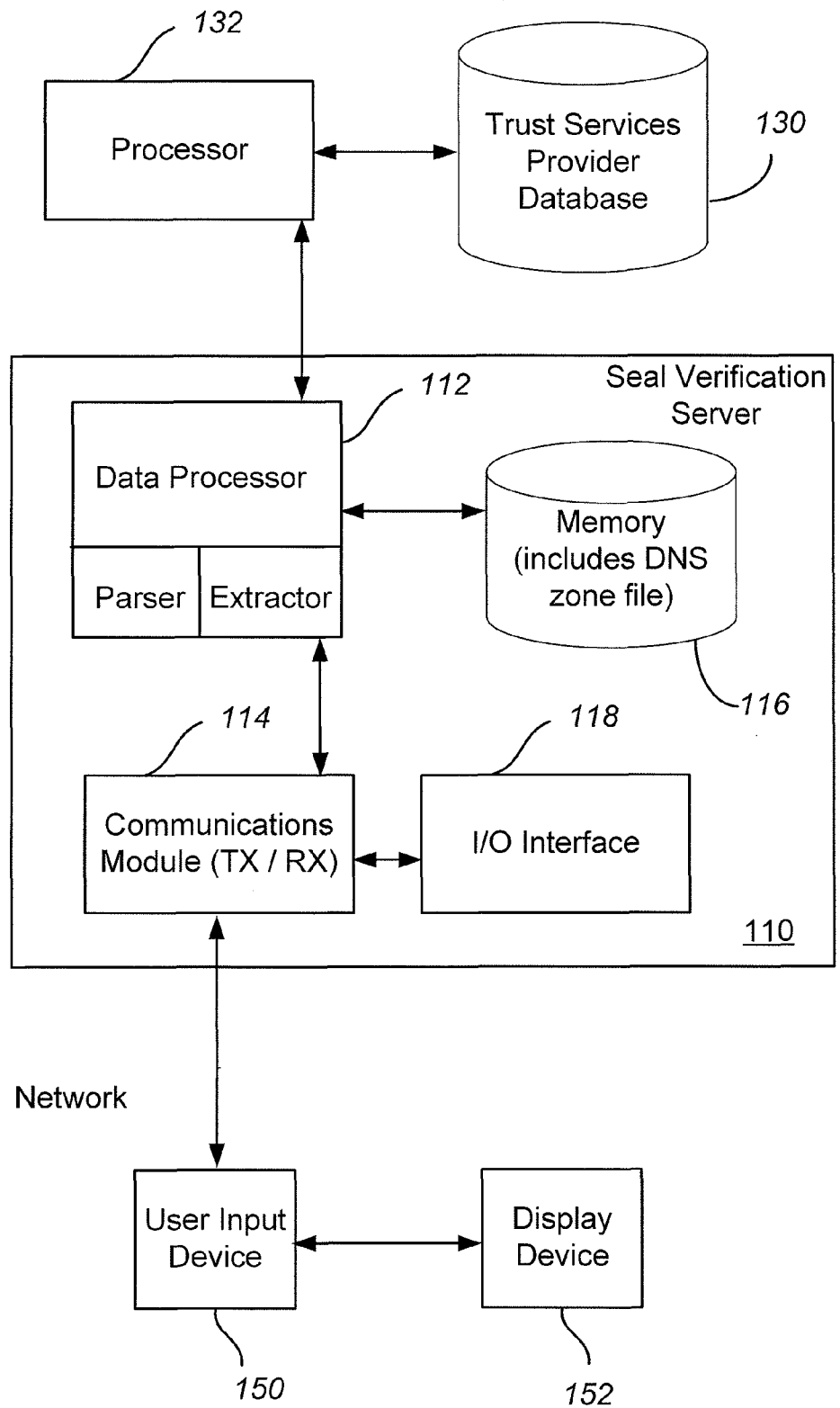
FIG. 1 is a simplified schematic diagram of a system for providing security seals for search results according to an embodiment of the present invention.

FIG. 1 is a simplified schematic diagram of a system for providing security seals for search results according to an embodiment of the present invention. The system, which may be part of a larger Trust Services (e.g., certificate) management system, includes a processor 132 and a Trust Services provider database 130. The customer list for the Trust Services provider is stored in Trust Services provider database 130. Processor 132 is able to retrieve the customer list and provide the customer list to data processor 112, which then stores the customer list in memory 116 as a DNS zone file. Thus, the DNS zone file is updated on a regular basis as appropriate to the particular implementation. It will be appreciated that data in addition to the customer list is stored by the Trust Services provider in Trust Services provider database 130, for example, data utilized to perform additional DNS functions. In order to protect the identity of some customers, a filtering process could be performed when creating the DNS zone file from the full customer list. Thus, the DNS zone file could be a filtered list of customers, only revealing the names of customers that have consented to having their identity as a customer revealed.

The seal verification server 110 includes data processor 112, also referred to as a processor, and memory 116. As described more fully in relation to FIG. 2 below, the data processor 112 (also referred to as a processor) will receive DNS queries from communications module 114, which is able to both transmit and receive data and messages, as well as parse the DNS query. The processor 112 can extract a host name from the DNS query, access memory 116, and compare the host name against the DNS zone file to determine if the host name is associated with a customer of the Trust Services provider. The parser and the extractor are highlighted in the schematic diagram, but other functionality can be included in the processor 112 including memory access and a comparator.

Processor 132 and data processor 112 can be general purpose microprocessors configured to execute instructions and data, such as Pentium processors manufactured by the Intel Corporation of Santa Clara, Calif. They can also be Application Specific Integrated Circuit (ASIC) devices that embody at least part of the instructions for performing the method in accordance with the present invention in software, firmware and/or hardware. As an example, such processors include dedicated circuitry, ASICs, combinatorial logic, other programmable processors, combinations thereof, and the like. The memory (also referred to as a database or a computer readable medium) 116 can be local or distributed as appropriate to the particular application. The Trust Services provider database 130 and memory 116 can store information related to the certificates issued by the CA, information related to malware detection and/or security vulnerability analysis, program code and instructions executed by the processor 132 and data processor 112, and other suitable data. In an exemplary embodiment, memory 116 stores the DNS zone file used in implementing the method described herein.

Memory 116 may include a number of memories including a main random access memory (RAM) for storage of instructions and data during program execution and a read only memory (ROM) in which fixed instructions are stored. Thus, memory 116 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

The seal verification server 110 also includes communications module 114 and I/O interface 118 in one embodiment. The I/O interface enables a system operator to interact directly with the seal verification server 110. The I/O interface is optional in other embodiments. The communications module 114 includes a receiver and a transmitter as illustrated by the RX/TX text in FIG. 1. The receiver and transmitter are operable to interact with a user input device 150 and a display device 152 over a network. The network can be the Internet or other network suitable for the communication of data and commands. Thus, a user is able, through a user interface interacting with the user input device 150 and the display device 152 to submit information including host names in order to perform the methods described herein. The user input device 150 and display device 152 will typically be contained in computing device including an additional processor. As an example, the user input device and display device can be components of a computer (e.g., a laptop, a desktop, a PDA, a tablet computer, a notebook, a mobile phone, or the like) or a web application that the user is operating to perform searches. One of ordinary skill in the art would recognize many variations, modifications, and alternatives. Typically, the user will interact with the seal verification server 110 using one or more (GUIs) receiving input through user input device 150 and displaying output through display device 152.

Figure 2:
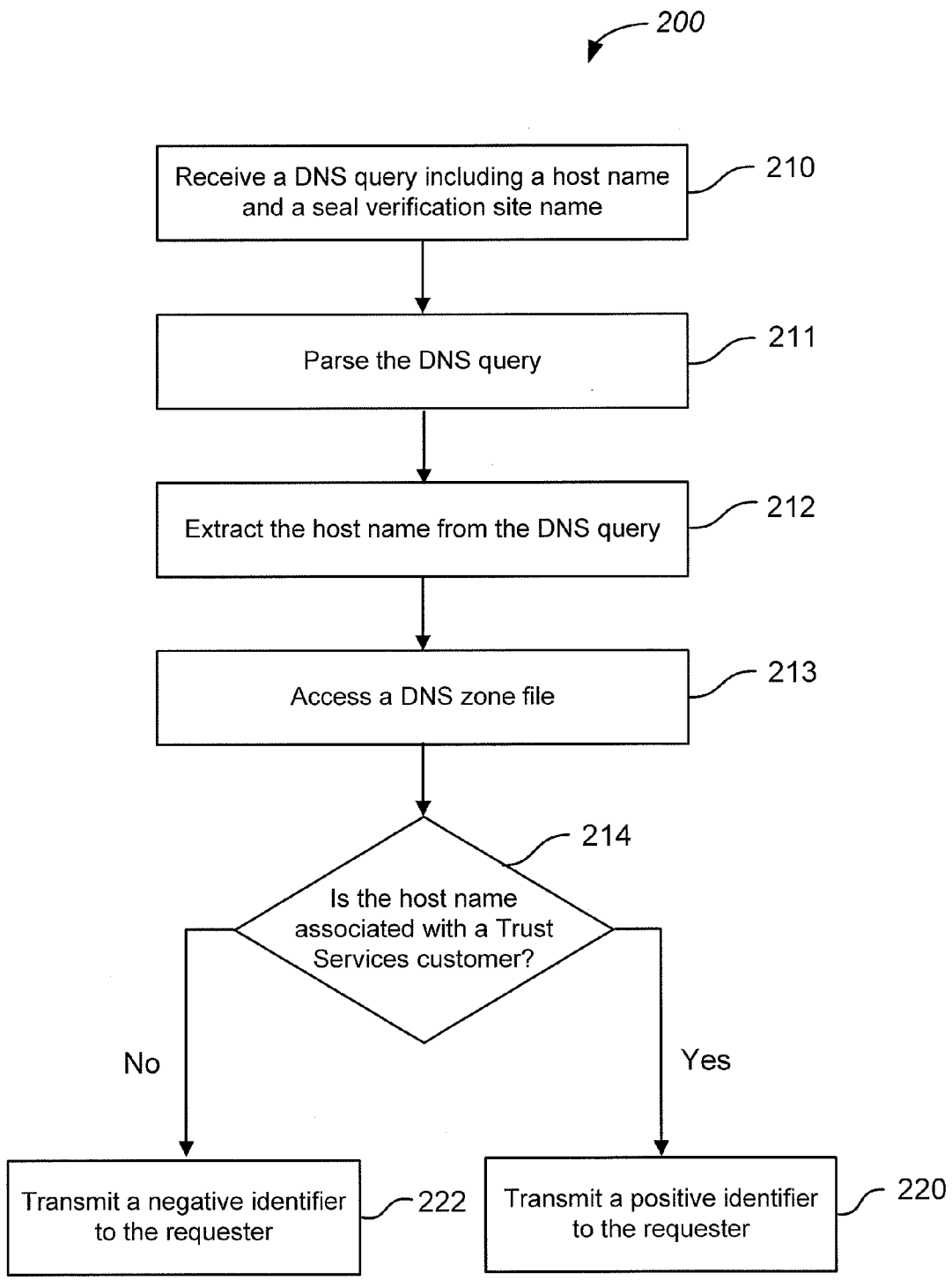
FIG. 2 is a simplified flowchart illustrating a method of operating a security seal server according to an embodiment of the present invention.

FIG. 2 is a simplified flowchart illustrating a method of operating a security seal server according to an embodiment of the present invention. The method 200 includes receiving a DNS query from a requester (210). In some implementations, the requester is a client or an add-on running on a browser. The DNS query, also referred to as a DNS address query, includes a host name and a seal verification site name. For example, if the host name is www.schwab.com and the seal verification site name is seal.verisignlabs.com, then the DNS query would be www.schwab.com.seal.verisignlabs.com. In this example, the host name, including the top-level domain (i.e., com) and both subdomains (i.e., schwab and www) are concatenated with the seal verification site name to form the DNS query. In other embodiments, only the first subdomain could be included in the DNS query. Typically, the suffix appended to the host name is a subdomain of the provider of the SSL certificates, in this example, a subdomain of verisignlabs.com.

In order to provide web site verification information, the browser or a client running on the browser, provides the web site name, referred to as a host name, to one or more providers of SSL certificates or other Trust Services. Because their customer lists are typically considered to be proprietary information of the Trust Services provider, the browser or client submit the host name and then the process of comparing the submitted names against customer names is performed by the Trust Services providers. As an example, one or more host names are transmitted to a server controlled by VeriSign (e.g., a server at seal.verisignlabs.com) so that the one or more host names can be compared against a list of valid VeriSign certificate customers. Look-up requests can also be sent to other Trust Services providers as well. A benefit provided by embodiments of the present invention is that DNS queries are typically faster than database queries and leverage the caching that is currently implemented in the resolver libraries, enabling the client to access results with a high efficiency. In an embodiment, the client can implement a batch mode in which multiple requests are sent using a suitable protocol.

The method also includes parsing the DNS query (211) and extracting the host name (212). For the example given above, the host name www.schwab.com would be extracted from the DNS query. In an embodiment, the DNS subdomain (e.g., seal.verisignlabs.com) is configured with a DNS zone file generated from a Trust Services provider database 130 containing the Trust Services (e.g., certificate) client list. The DNS zone file is stored in a memory 116 accessible to a data processor 112 performing one or more of the functions described herein. Thus, the SSL certificate customer list stored in the Trust Services provider database 130 is converted into a DNS zone file in this embodiment. At regular intervals, the DNS zone file is regenerated and the DNS server software reloads the updated file. As illustrated in FIG. 1, the processor 132 can pull a customer list from Trust Services provider database 130 and transmit all or a portion of the customer list to data processor 112 for storage in memory 116. The DNS zone file is accessed (213) and the DNS query is then compared to the DNS zone file, which provides information on all of the Trust Services provider's customers. The DNS server software can be configured to deny zone file transfer requests to avoid revealing the entire client list via unauthorized DNS requests.

A determination is then made of whether the host name is associated with a customer who has purchased one or more security services (e.g., a current SSL certificate) from the Trust Services provider (214). If the host name is associated with a Trust Services customer, for example, if the web site has a valid SSL certificate from the Trust Services provider, then a positive identifier is transmitted to the requester (220). In one embodiment, in response to the DNS query, the address returned for host names associated with customers (i.e., positive look-ups) is of the form 127.0.0.x, where x is any odd number from 1 to 253. Addresses of this type are non-routable to avoid confusion. In a particular implementation, the HTTP status code is set to 200 (OK) in response to a positive lookup.

The least significant byte in the address (i.e., x) can be used to convey additional information to the requester. As an example, it can be used to communication information associated with the type of seal authorized for display in association with the web site. Thus, for certificates of varying security, different seal graphics could be displayed for each of the certificate types, communicating additional information to the user. The type of certificate possessed by the customer could be indicated in this least significant byte, resulting in different seals being displayed. As another example, if a customer is participating in an A/B split testing program, information related to the two groups could be communicated using the least significant byte. Merely by example, x=7 could be used to communicate that the customer is in an A/B test and the seal should be displayed and x=9 could be used to communicate that the customer is in an A/B test and the seal should not be displayed. Thus, various types of additional information can be communicated using the least significant byte or other portions of the returned address. In summary, the least significant byte provides an opportunity to add more features and more sophisticated behavior to the clients. One of ordinary skill in the art would recognize many variations, modifications, and alternatives.

Examples of the use of the least significant byte to communication information related to the certificate type and participation in an A/B split testing program are:

||SSL Certificate and participating in A/B split testing||127.0.0.5||bit 0 and bit 2 are set||

||EV SSL Certificate and participating in A/B split testing||127.0.0.7||bit 0, bit 1 and bit 2 are set||

||Malware free and participating in A/B split testing||127.0.0.9||bit 0 and bit 3 are set||

||SSL Certificate, Malware free and participating in A/B split testing||127.0.0.11||bit 0, bit 1 and bit 3 are set||

||SSL Certificate but NOT participating in A/B split testing||127.0.0.1||only bit 0 is set||

||EV SSL Certificate but NOT participating in A/B split testing||127.0.0.3||bit 0 and bit 1 are set||

These examples are not intended to limit the scope of the present invention, but only to illustrate the range of options available using embodiments of the present invention. In addition to these examples related to digital certificates, other embodiments relate to other Trust Services including verifying that a web site is free of malware, has security vulnerabilities, or the like. In order to detect lack of security on a web site, the scanning technology developed either by the Trust Services provider or by a third party under contract can be utilized. Additionally, data sets available from other sources, including black lists that indicate a web site has malware, may be used to perform scanning and/or to provide inputs for decisions to display/not display a security seal.

If the host name is not associated with a Trust Services customer, a negative identifier is transmitted to the requester (222). In one embodiment, in response to the DNS query, an address of 127.0.0.0 is returned, with the least significant byte communicating the fact that the web site does not possess a valid certificate and is not a customer of other Trust Services provided by the Trust Services provider. Other responses including a null response could also be utilized to indicate the lack of a valid certificate or lack of other Trust Services. As an example, a 404 (not found) HTTP status code could be returned to the client as a negative indicator.

Embodiments of the present invention provide numerous benefits by leveraging the DNS infrastructure to utilize a DNS look-up approach to provide web site verification information. These benefits include lightweight client code and minimal loading on the networks and servers of the Trust Services providers. Since the technique leverages the DNS resolver built into every operating system, the client code utilized to perform the methods described herein is small. As will be evident to one of skill in the art, DNS is a distributed system and loads on DNS resolvers are reduced by caching across the DNS network. In order to reduce update latency, the DNS record time-to-live may be configured to reduce the latency at the expense of increased loading. The DNS zone files can be updated on a periodic basis, for example, every two hours, in order to provide current information in response to queries.

It should be appreciated that the specific steps illustrated in FIG. 2 provide a particular method of operating a security seal server according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
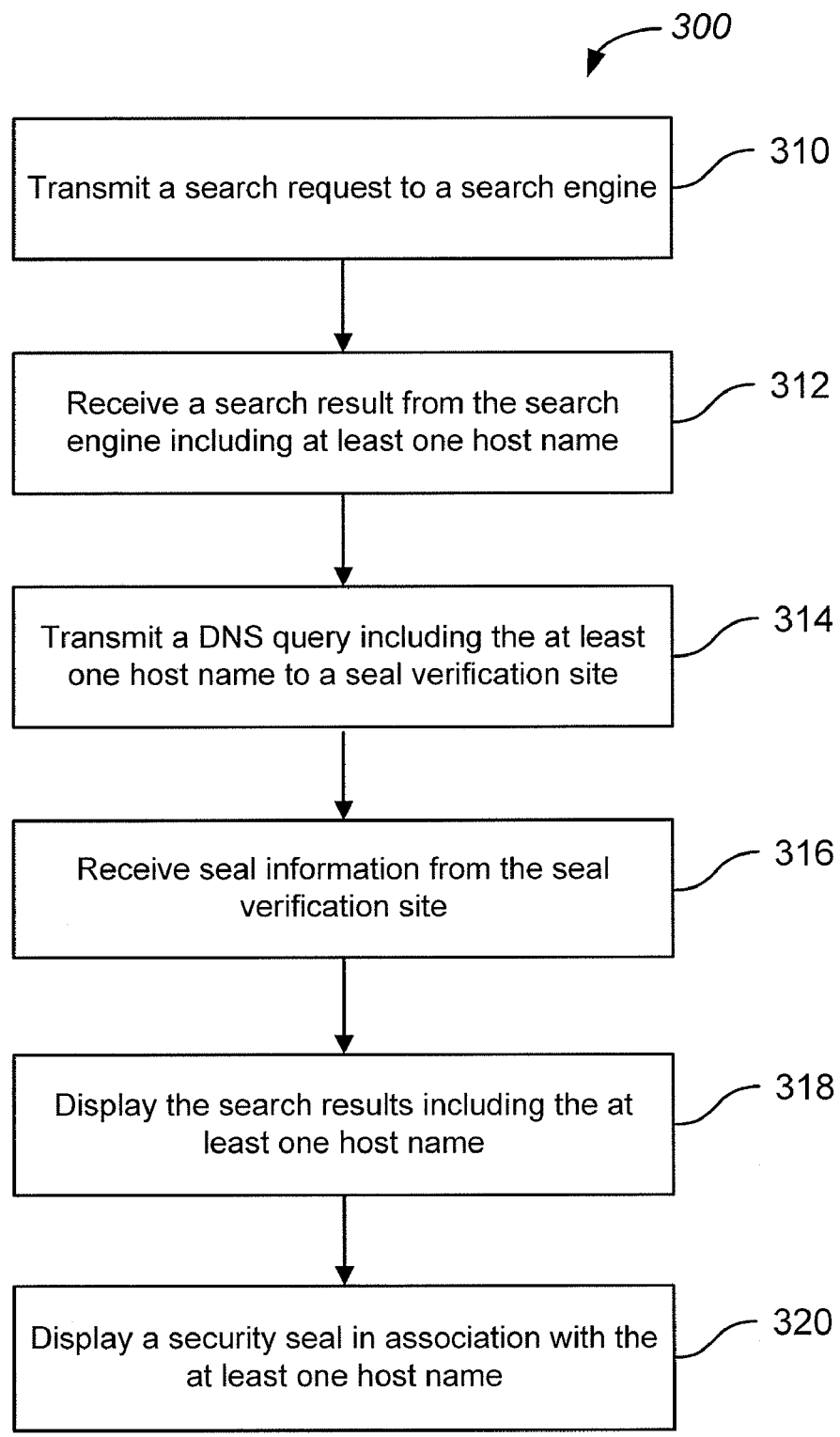
FIG. 3 is a simplified flowchart illustrating a method of displaying security seals in a web browser according to an embodiment of the present invention.

FIG. 3 is a simplified flowchart illustrating a method of displaying security seals in a web browser according to an embodiment of the present invention. The method 300 includes transmitting a search request to a search engine (310). The search result will be received from the search engine and will include one or more host names (312). Typically, multiple host names and information about the web sites that were returned by the search will be displayed on the search results web page. As an example, a search using Google will return a list of links to web sites and cursory information regarding the various web sites that are displayed. The links may include sponsored links and/or unsponsored links. According to a specific embodiment of the present invention, the web sites returned in the search results will be compared against a list of SSL certificate customers. As examples, the customer list could be a list for a single Trust Services provider or lists for multiple Trust Services providers.

The method also includes transmitting a DNS query (also referred to as a DNS look-up) to a seal verification site (314). It should be noted that although some embodiments provide the functionality of verifying that a web site has a valid digital certificate, the present invention is not limited to this particular embodiment. Therefore, customers that will have a seal displayed in association with their web site can be customers of other Trust Services including scanning for malware, security vulnerabilities, or the like. Thus, the category of Trust Services covers the variety of services that may be provided and verified according to embodiments of the present invention. Thus, a customer may be included in a customer list as a result of the purchase of one of several services including digital certificates. The DNS query is typically transmitted by a client (e.g., an add-on) running on the browser although the functionality discussed herein could be integrated into the browser operation. The DNS query will include a host name returned by the search and a seal verification site name. Continuing with the example discussed in relation to FIG. 2, the host name could be www.schwab.com and the seal verification site name could be seal.verisignlabs.com, resulting in a DNS query of www.schwab.com.seal.verisignlabs.com. In this example, the host name and the seal verification site name are concatenated to form the DNS query. Other combinations that communicate information about the web sites found in the search results and the seal verification site name can be utilized as well. DNS queries of this type can be transmitted for all the web sites that were returned in the search results.

The seal verification site will compare the host name to a list of current Trust Services customers (e.g., certificate owners) and return seal information to the requester (316). As discussed in relation to FIG. 2, the seal information could be provided as an address returned by the seal verification server that indicates that the web site has a valid certificate, as well as additional information related to the type of certificate or the like. Thus, the seal information is included in a returned address in one embodiment. Additionally, the address could indicate that no valid certificate is associated with the host name. The client interprets the returned address as needed.

The search results including the host name are displayed (318) and a security seal is displayed in association with the host name (320). Because of the quick turnaround on DNS queries, the security seals can be displayed in real-time as the search results are displayed. FIG. 4B illustrates an example of how security seals can be displayed adjacent or next to the web site links in the search results. The security seals, typically stored as .gif or .jpeg images, are provided to the client during an initialization phase or otherwise as appropriate to the particular implementation. For host names that are not in the list of Trust Services customers, no security seal will be displayed. Alternatively, a graphic could be displayed to indicate, for example, that the web site lacks a certificate or has inadequate protection. Thus, embodiments of the present invention provide methods and systems for providing security information inline with the search results. Thus, it is readily apparent to the user which sites have valid security issued by a Trust Services provider and which sites do not have such protections.

Although the method illustrated in FIG. 3 provides Trust Services information for a single Trust Services provider, the present invention is not limited to this particular implementation. The client could transmit DNS queries to multiple Trust Services providers, thereby displaying information related to the certificates issued by or other Trust Services provided by the various providers.

It should be appreciated that the specific steps illustrated in FIG. 3 provide a particular method of displaying security seals in a web browser according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Referring once again to FIG. 1, a user will prepare a request through the user input device 150. Typically, this operation will be performed automatically by a client running on a browser as described above. The request will include a DNS query. The DNS query will be transmitted to the communications module 114, where it is received and then processed. The data processor 112 will parse the DNS query and extract the host name from the DNS query or a parsed version of the DNS query. Since the data processor 112 has been updating the DNS zone file stored in memory 116, typically on a regular basis, a formatted list of Trust Services (e.g., certificate) customers is available for comparison with the host name.

The processor performs a lookup or other action in order to compare the host name to the list of Trust Services customers, which may be a filtered list. If the host name is a customer, then the processor instructs the communications module 114 to transmit a response that indicates a positive identifier so that the security seal can be displayed on the display device 152, for example, displaying the security seal to the right of the web site link associated with the host name. Positive identifiers associated with particular addresses have been discussed above. If the host name is not a customer, then the processor instructs the communications module 114 to transmit a response that indicates a negative identifier. In this case, no security seal is displayed in association with the web site link associated with the host name. The negative identifier may be a non-existent domain status message or other suitable identifier.

Thus, embodiments of the present invention are applicable to certificate providers as well as providers of other Trust Services. Utilizing embodiments of the present invention, a variety of services are provided including display of a seal in search as visual indication of the services. As an example, if a web site has been scanned for malware or vulnerabilities and is clean, an appropriate security seal can be displayed in conjunction with the search results.

Figure 4A:
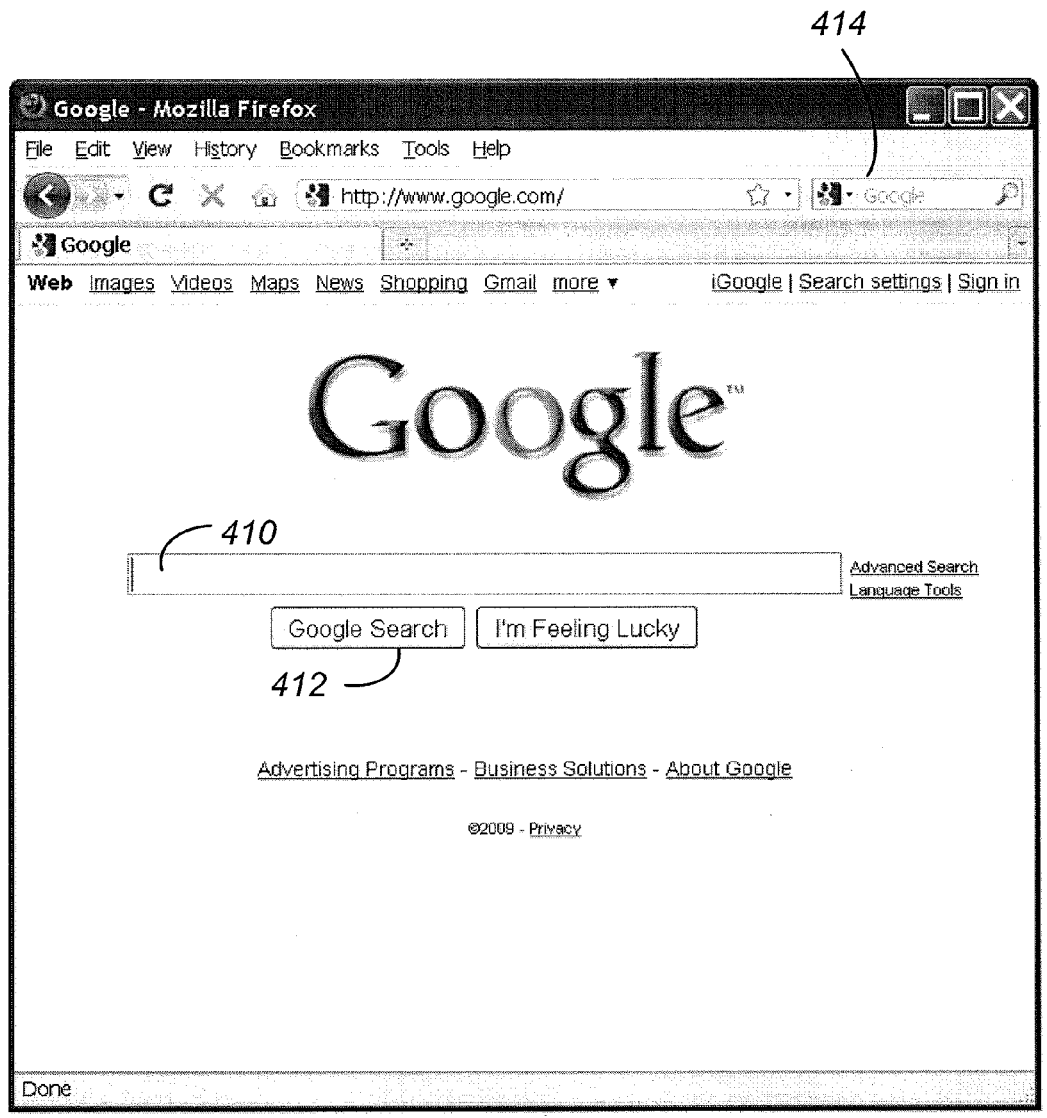
FIG. 4A is a simplified screenshot of a conventional search engine web page.
Figure 4B:
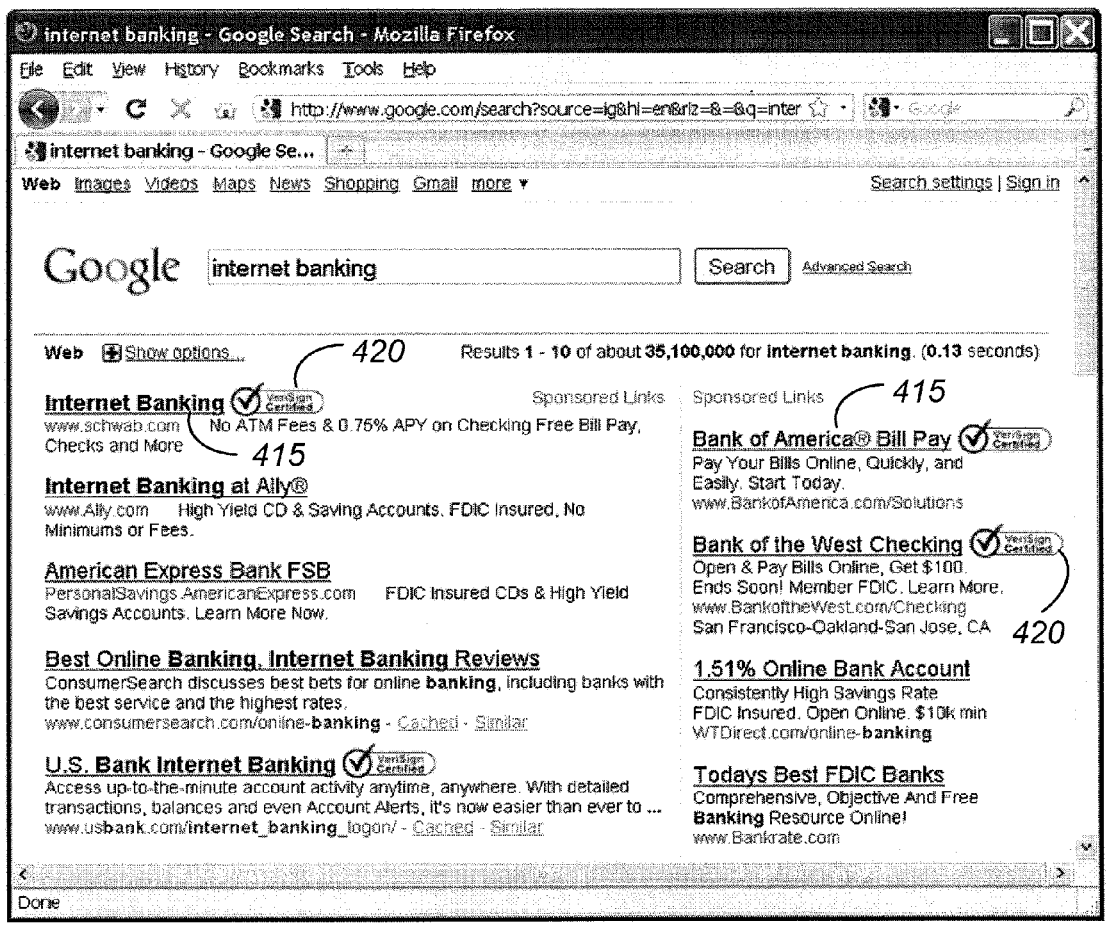
FIG. 4B is a simplified screenshot of a web page with search results and security seals according to an embodiment of the present invention.

FIG. 4A is a simplified screenshot of a conventional search engine web page. The search query is entered into the input area 410 and a search is conducted by clicking the user input button 412. Of course, other methods of initiating Internet searches can be utilized, including the Google Toolbar 414 displayed in the upper right hand corner of the browser, through a search feature on a smart phone, or the like. One of ordinary skill in the art would recognize many variations, modifications, and alternatives. After the search is initiated, the search results will be displayed as illustrated in FIG. 4B.

FIG. 4B is a simplified screenshot of a web page with search results and security seals according to an embodiment of the present invention. As illustrated in FIG. 4B, embodiments of the present invention display security seals integrated with the search results. As an example, graphical elements 420, for example, the VeriSign Secured® Seal, are inserted adjacent to web site links 415 to indicate that the particular web site has a valid SSL certificate issued by the Trust Services provider. In the embodiment illustrated in FIG. 4B, web sites that have been verified and issued an SSL certificate by VeriSign are identified by the VeriSign Secured® Seal. Thus, as the search results are presented to the user, web site verification information is also presented to the user so that that the user's confidence in the secure websites is increased.

Referring to FIG. 4B, in response to the search for "internet banking," www.schwab.com is listed in the search results, along with the VeriSign Secured® Seal. www.Ally.com and PersonalSavings.AmericanExpress.com do not have a graphical element 420, indicating that these web sites do not have a valid SSL certificate issued by VeriSign. In the Sponsored Links column, the www.BankofAmerica.com/Solutions and www.BankoftheWest.com/Checking web sites are also indicated as a valid customer for a VeriSign SSL certificate. Thus, using embodiments of the present invention, seals can be inserted into search results or other internet pages to indicate web pages with valid certificates or other Trust Services.

Figure 4C:
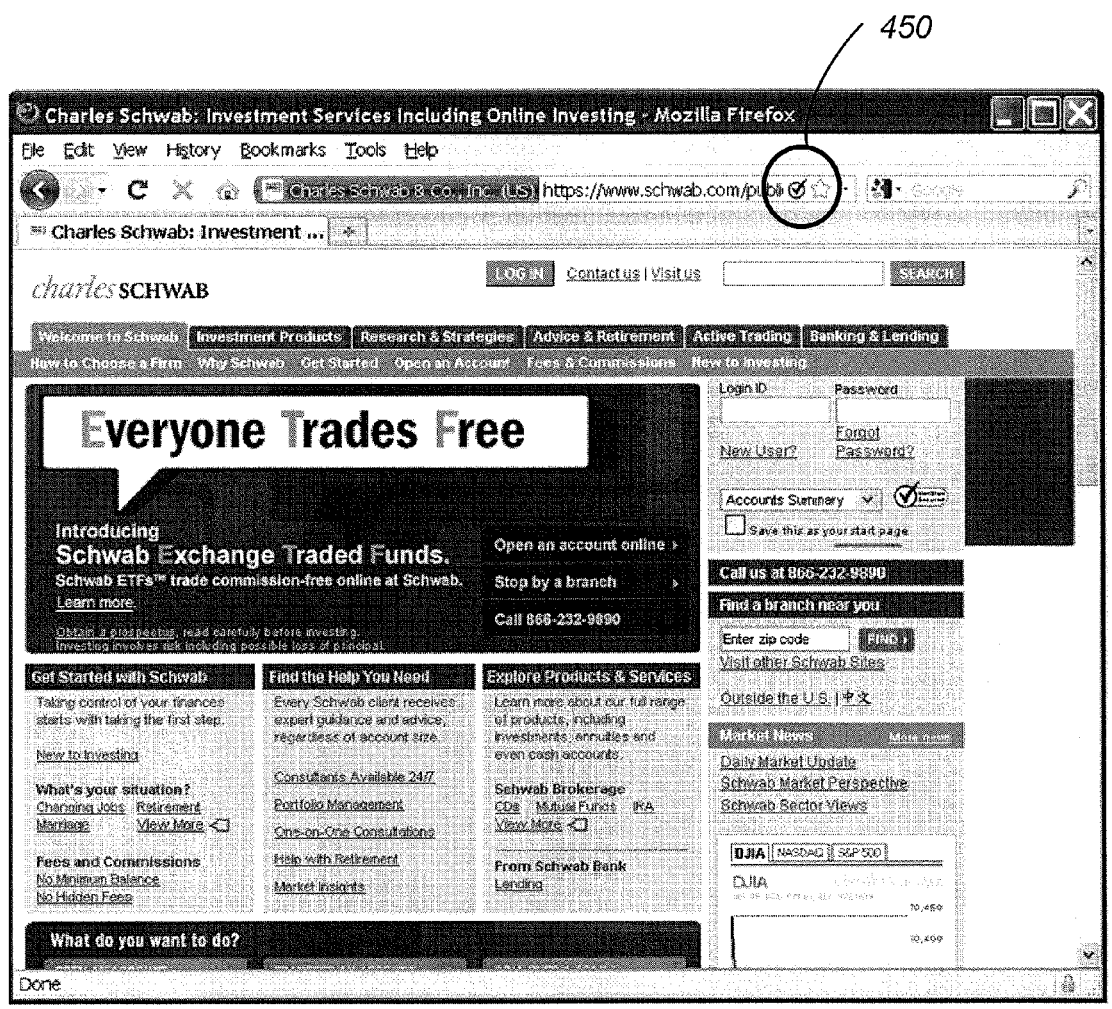
FIG. 4C is a simplified screenshot of a web page with a security seal according to an embodiment of the present invention.

FIG. 4C is a simplified screenshot of a web page with a security seal according to an embodiment of the present invention. As illustrated in FIG. 4C, the address line of the browser includes a security seal 450 displayed after the web site address. When the web site is loaded, a client, for example, an add-on running on the browser or the browser itself, transmits a DNS query to a seal verification server as discussed in relation to FIGS. 2 and 3. In response, the seal verification server responds with an address indicating whether or not the web site possesses a valid certificate. The client or browser parses the address and extracts seal verification information that initiates a display of the security seal 450 in the address line. The security seal could be displayed in other locations on the web page as appropriate to the particular application.

Figure 5:
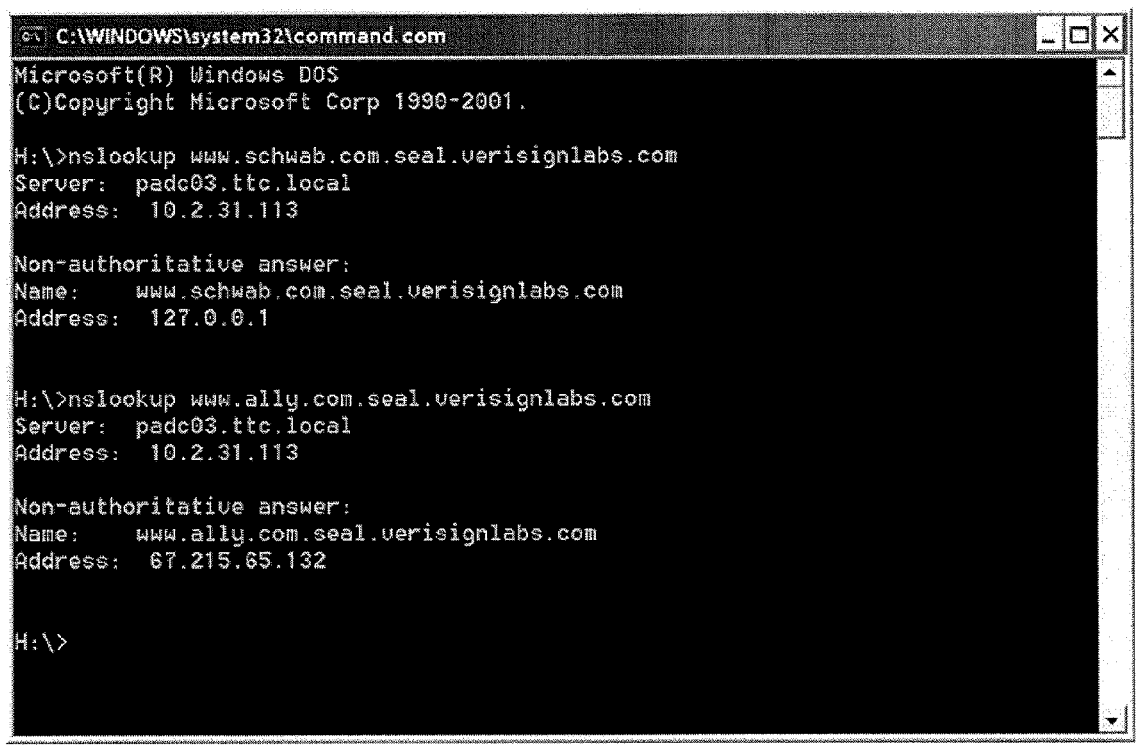
FIG. 5 is a screenshot of DNS look-ups performed using a command line tool according to an embodiment of the present invention.

FIG. 5 is a screenshot of DNS look-ups performed using a command line tool according to an embodiment of the present invention. As illustrated in FIG. 5, a command of "nslookup www.schwab.com.seal.verisignlabs.com" resulted in a response of Address: 127.0.0.1. This response indicates that www.schwab.com has been found in the list of Trust Services customers for which the seal should be displayed. A command of "nslookup www.ally.com.seal.verisignlabs.com" resulted in a response of Address: 67.215.65.132. This response indicates that www.ally.com has not been found in the list of Trust Services customers. Thus, FIG. 5 is an example of behavior related to the present invention. If the host name is in the list maintained by the Trust Services provider, the client receives an address that it can than exploit to perform certain actions, for example, displaying the security seal. If the host name is not in the list, a non-authoritative answer can be returned and the client does not display a security seal, can display a specific message, or the like.

In the method described in relation to FIG. 2, a DNS look-up was utilized to obtain information regarding a host name's security (e.g., certificate) status. Alternatively, security status information could be obtained using an API running over HTTP(S). As an example, the client could transmit a request for security information using an HTTP(S) request. The seal verification server could receive this HTTP(S) request and then convert it into a DNS look-up and use the mechanisms described above to determine if the host name is associated with a Trust Services customer. Alternative methods of responding to an HTTP(S) request could also be utilized. Because DNS responses may be "spoofed" by attacks on DNS servers operating between the client and the seal verification server, some embodiments utilize an alternative or complementary look-up mechanism using a secure HTTPS connection that is used to verify affirmative responses and eliminate false-positive seal data. In some embodiments, the HTTP(S) queries rely on standard web API techniques.

Therefore, both DNS look-ups and HTTP(S) requests are included within the scope of the present invention. The response times for DNS look-ups are typically 20-30 times faster than the responses for HTTP(S) requests, enabling the search results with seals to be displayed more quickly in some DNS look-up implementations in comparison to other protocols.

DNS security extensions (DNSSEC) are currently being standardized and implemented. The implementation of DNSSEC will provide a mechanism for obtaining seal verification information using a secure connection. It is possible that the added security provided by DNSSEC, enabling the seal verification server to be queried over a trusted network, will be used in place of alternative or complementary look-ups using HTTP(S) protocols. Thus, embodiments of the present invention can utilize DNSSEC look-ups in addition to the DNS look-ups described herein. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of providing web site verification information to a user, the method comprising:
    receiving a DNS query including a host name and a seal verification site name;
    parsing the DNS query;
    extracting the host name from the DNS query;
    accessing a file associated with a DNS zone, the file including a list of service customers;
    determining if the host name is associated with a service customer in the list of service customers;
    transmitting a positive identifier to the requester if the host name is associated with a service customer; and
    transmitting a negative identifier to the requester if the host name is not associated with a service customer.

2. The method of claim 1 wherein the service customers comprise certificate customers.

3. The method of claim 1 wherein the DNS query includes the host name concatenated with the seal verification site name.

4. The method of claim 1, wherein the file is a DNS zone file, the method further comprising forming the DNS zone file including the list of service customers based on a certificate customer list.

5. The method of claim 1, wherein the file is a DNS zone file, the method further comprising forming the DNS zone file including the list of service customers based on a malware detection customer list.

6. The method of claim 1, wherein the file is a DNS zone file, the method further comprising forming the DNS zone file including the list of service customers based on a security vulnerability analysis customer list.

7. The method of claim 1 wherein the positive identifier comprises a non-routable address.

8. The method of claim 7 wherein the non-routable address is of the form 127.0.0.x, wherein x is an odd number between 1 and 253.

9. The method of claim 1 wherein the service customer possesses an SSL certificate having a certificate class and the positive identifier includes information related to the certificate class for the SSL certificate.

10. The method of claim 1 wherein the negative identifier comprises a non-routable address.

11. The method of claim 10 wherein the address is of the form 127.0.0.0.

12. The method of claim 1 wherein the DNS query complies with DNSSEC.

13. The method of claim 1 wherein, if the host name is associated with a service customer, the method further comprises:
    receiving an HTTP request including the host name;
    accessing the DNS zone file;
    verifying that the host name is associated with the service customer; and
    transmitting a second positive identifier to the requester.

14. The method of claim 13 wherein the HTTP request complies with HTTPS.

15. The method of claim 13 wherein the second positive identifier comprises the first positive identifier.

16. A method of displaying a security seal in a web browser, the method comprising:
    transmitting a search request to a search engine;
    receiving a search result from the search engine, the search result including at least one host name;

transmitting a DNS query to a seal verification server, wherein the DNS query includes the at least one host name and a seal verification site name associated with the seal verification server;

receiving seal information associated with the at least one host name from the seal verification server;

displaying the search result including the at least one host name; and displaying the security seal in association with the at least one host name.

17. The method of claim 16 further comprising concatenating the at least one host name and the seal verification site name of the seal verification server to form the DNS query.

18. The method of claim 16 wherein the at least one host name comprises a web site name.

19. The method of claim 16 wherein the seal information associated with the at least one host name comprises a web site name.

20. The method of claim 16 wherein the seal information comprises a DNS response including a non-routable address.

21. The method of claim 16 wherein at least a portion of the seal information is contained in a portion of an address.

22. The method of claim 21 wherein the address is a non-routable address of the form 127.0.0.x.

23. The method of claim 22 wherein a value of x indicates a class of service.

24. The method of claim 22 wherein a value of x indicates a class of an SSL certificate associated with the host name.

25. The method of claim 16 wherein displaying the security seal in association with the at least one host name comprises displaying the security seal to the right of a link to the at least one host name.

26. The method of claim 16 wherein the search result includes a second host name, the method further comprising:

transmitting a second DNS query to the seal verification server, wherein the second DNS query includes the second host name;

receiving seal information associated with the second host name from the seal verification site;

displaying the search result including the second host name; and displaying the security seal in association with the second host name.

27. A non-transitory computer readable medium having instructions that, when executed by a data processor, cause the data processor to perform a method comprising:

receiving a DNS query including a host name and a seal verification site name;

parsing the DNS query;

extracting the host name from the DNS query;

accessing a list of service customers;

determining if the host name is associated with a service customer in the list of service customers;

transmitting a positive identifier to the requester if the host name is associated with a service customer; and transmitting a negative identifier to the requester if the host name is not associated with a service customer.

28. The non-transitory computer readable medium of claim 27, the method further comprising:

forming a DNS zone file including the list of service customers based on at least one of a certificate customer list, a malware detection customer list or a security vulnerability analysis customer list.

29. The non-transitory computer readable medium of claim 27, wherein the positive identifier comprises a non-routable address and the DNS query includes the host name concatenated with the seal verification site name.

30. A non-transitory computer readable medium having instructions that, when executed by a data processor, cause the data processor to perform a method comprising:

transmitting a search request to a search engine;

receiving a search result from the search engine, the search result including at least one host name;

transmitting a DNS query to a seal verification server, wherein the DNS query includes the at least one host name and a seal verification site name associated with the seal verification server;

receiving seal information associated with the at least one host name from the seal verification server;

displaying the search result including the at least one host name; and displaying a security seal in association with the at least one host name.

31. The non-transitory computer readable medium of claim 30, wherein the seal information comprises a DNS response including a non-routable address.

32. The non-transitory computer readable medium of claim 30, wherein at least a portion of the seal information is contained in a portion of an address.

* * * * *